US005611910A

United States Patent [19]
Marzari et al.

[11] Patent Number: 5,611,910
[45] Date of Patent: Mar. 18, 1997

[54] METHOD FOR REDUCING SULFUR EMISSIONS IN PROCESSING AIR-BLOWN ASPHALT

[75] Inventors: Jorge A. Marzari, Bolingbrook; Michael R. Franzen, Lombard; Jeffrey W. Smith, Bolingbrook, all of Ill.

[73] Assignee: Owens-Corning Fiberglas Technology, Inc., Summit, Ill.

[21] Appl. No.: 599,773

[22] Filed: Feb. 12, 1996

Related U.S. Application Data

[63] Continuation-in-part of Ser. No. 459,081, Jun. 2, 1995.

[51] Int. Cl.$^6$ .................... C10C 1/20; C10C 3/02
[52] U.S. Cl. .................... 208/44; 208/22; 208/230; 106/284.03
[58] Field of Search .................... 208/226, 230, 208/44, 22, 23; 423/242.1; 106/284.02, 284.03, 284.04

[56] References Cited

U.S. PATENT DOCUMENTS

| | | | |
|---|---|---|---|
| 1,782,186 | 11/1930 | Abson | 208/5 |
| 1,997,569 | 4/1935 | Craig et al. | 106/284.03 |
| 2,112,250 | 3/1938 | Penniman | 208/7 |
| 2,179,208 | 11/1939 | Burk et al. | 196/74 |
| 2,200,914 | 5/1940 | Burk et al. | 208/4 |
| 2,272,866 | 2/1942 | Burk et al. | 208/44 |
| 2,287,511 | 9/1942 | Burk et al. | 208/44 |
| 2,313,596 | 3/1943 | Sorem et al. | 106/24 |
| 2,450,756 | 10/1945 | Holberg | 196/74 |
| 2,488,293 | 11/1949 | Hoiberg | 208/5 |
| 2,506,283 | 5/1950 | Smith et al. | 106/284.3 |
| 2,627,498 | 2/1953 | Fink et al. | 208/4 |
| 2,776,932 | 1/1957 | Hardman et al. | 208/44 |
| 2,861,940 | 11/1958 | Apellaniz | 208/5 |
| 3,126,329 | 3/1964 | Fort | 208/4 |
| 3,440,073 | 4/1969 | Fowler et al. | 106/273 |
| 3,839,190 | 10/1974 | Frege et al. | 208/44 |
| 3,919,072 | 11/1975 | Pitchford | 208/23 |
| 4,199,431 | 4/1980 | Carlus et al. | 208/27 |
| 4,202,755 | 5/1980 | Spiegelman et al. | 208/5 |
| 4,338,137 | 7/1982 | Goodrich | 106/273 R |
| 4,428,828 | 1/1984 | Bose | 208/208 R |
| 4,440,579 | 4/1984 | Eidem | 106/274 |
| 4,456,523 | 6/1984 | Carlus et al. | 208/5 |
| 4,456,524 | 6/1984 | Wombles et al. | 106/279 |
| 4,544,411 | 10/1985 | Wombles | 106/279 |
| 4,618,373 | 10/1986 | Eidem | 106/273 R |
| 4,801,332 | 1/1989 | Selfridge | 208/44 |
| 4,806,232 | 2/1989 | Schmidt | 208/226 |
| 4,908,064 | 5/1990 | Plummer | 208/44 |
| 5,104,518 | 4/1992 | Jaser | 208/14 |
| 5,330,569 | 7/1994 | McGinnis | 208/27 |

OTHER PUBLICATIONS

Schaack et al., "Formaldehyde–Methanol, Technology, Oil and Gas Journal Metallic–Oxide Agents Head Scavengers List", Jan. 23, 1989.

Schaack et al., "Caustic Based Process Remains Attractive", Technologym Oil and Gas Journal, Jan. 30, 1989.

Garrett et al., "Chemical Scavengers For Sulfides In Water–Base Drilling Fluids", Journal of Petroleum Technology, Jun. 1979.

*Primary Examiner*—Gary P. Straub
*Attorney, Agent, or Firm*—C. Michael Gegenheimer; Inger H. Eckert; Linda S. Evans

[57] ABSTRACT

In a method for reducing emissions from an asphalt blowing process, an emission reducing additive is added to the asphalt prior to blowing, or early in the blowing process. The emission reducing additive is added in an amount sufficient to reduce the $SO_x$ emissions from the blowing process by at least 25 percent by weight when compared with the same process without the emission reducing additive. The emission reducing additive includes at least two compounds selected from metal hydroxides, metal oxides, metal carbonates and metal bicarbonates, where the metal is selected from sodium, potassium, calcium, magnesium, zinc, copper and aluminum.

20 Claims, No Drawings

METHOD FOR REDUCING SULFUR EMISSIONS IN PROCESSING AIR-BLOWN ASPHALT

CROSS REFERENCE TO RELATED APPLICATION

This application is a continuation-in-part of copending application Ser. No. 08/459,081 by Jorge A. Marzari, filed Jun. 2, 1995, and assigned to the same assignee.

TECHNICAL FIELD

This invention relates to processing asphalt, and particularly to a method for reducing sulfur emissions when air-blowing asphalt. More specifically, this invention relates to a method which produces an asphalt preferred for use as a roofing asphalt. The asphalt is not detrimental to roofing materials or their properties.

BACKGROUND

Although most asphalts are used in paving, a significant percentage are used for other applications, primarily roofing and specialty coatings. Asphalts for roofing and specialty coatings are air-blown to reduce aging and to increase weather resistance. The air-blowing process also increases the usefulness of the asphalt by raising the softening point from a typical starting point of about 40° C. to a product having a softening point of 80° C. or higher. Unblown asphalts have low softening points, low viscosity (e.g., 12 cps at 205° C.) and high penetration (e.g., 250–300 mm/10 at 25° C.). In order to be able to generate an asphalt that has the desirable properties for roofing applications, it is necessary to air-blow it. The air-blowing process, also referred to as the oxidizing process, is used to thicken the asphalt raw material. As a result, the penetration decreases, and both the softening point and viscosity increase. Nevertheless, the resultant blown product at a selected softening point can be too hard and brittle at certain cooler temperatures, or can be so soft that it will flow on a hot summer day. Consequently, the relationship between the viscosity, penetration and softening point is very important. The trend in worldwide sources of asphalt is that the asphalt raw material blows to a harder product and the sulfur content is steadily increasing. These asphalts have lower penetrations when blown to the desired softening point, and the product properties of the resultant asphalt are adversely affected.

The air-blowing process involves loading the unblown asphalt raw material in a converter at temperatures within a range of from about 150° C. to about 205° C. Air is bubbled or blown through the molten asphalt. The reaction produced by the blowing is exothermic and raises the temperature of the asphalt to a temperature of about 260° C. The maximum temperature is usually controlled by a water-cooled jacket. The process is usually carried out in batches. The processing time can take from 1 hour up to about 18 hours for reaching the desired softening point. The amount of processing time is dependent on the process temperature and the characteristics of the asphalt. Catalysts are frequently blended into the mixture to increase the reaction rate, which thereby reduces the processing time. A commonly used catalyst is ferric chloride, which is typically used in concentrations of up to about 1 percent of the blended catalyst and asphalt. Catalysts can also help provide better penetrations for the desired softening point.

One of the problems with asphalt processing is the generation of unpleasant gaseous byproducts. Sulfur organic compounds are a significant component of these gaseous emissions. The asphalt blowing process produces flue gases including hydrocarbons, hydrogen sulfide, nitrogen oxide and carbon monoxide. The emissions of volatile organic compounds are controlled by best available control technology (BACT) incineration. As a result of the incineration, the oxidation of heterosulfur organic compounds and hydrogen sulfide generates $SO_x$. Typical undesirable $SO_x$ emissions include sulfur oxides such as $SO_2$ and $SO_3$, and combinations of those compounds with other substances such as water.

Unfortunately, the combustion process has its own undesirable waste stream. $SO_x$ emissions are generated from the combustion of the hydrogen sulfide or by the oxidation of mercaptans and heavier sulfur-organic compounds in the incinerator. One process presently used to reduce $SO_x$ emissions involves cleaning the effluent with expensive caustic scrubber equipment. The scrubbers require extensive initial capital costs and significant annual operating costs. The caustic scrubbing process generates such undesirable byproducts as sodium and potassium sulfides, sulfites and sulfates, all of which require special handling for disposal.

It would be advantageous if a process could be developed to reduce $SO_x$ emissions without requiring high cost capital equipment. Such a process would ideally also not generate any undesirable byproducts. Further, such a process should not retard the asphalt blowing process or adversely affect the softening point/viscosity/penetration relationships in the blown asphalt.

$NO_x$ emissions are another unpleasant gaseous byproduct from asphalt processing. It would be desirable if a process could be developed to reduce $SO_x$ emissions without greatly increasing the amount of $NO_x$ emissions.

It would also be desirable if such a process produced an asphalt that is noncorrosive and does not cause any detrimental effect on roofing materials or their properties. By way of background, asphalts for roofing can be used as built up roofing asphalt (BURA) or in asphalt roofing shingles. On a built up roof, a layer of asphalt is applied to the roof, followed by a mat of fiberglass or organic material, followed by another layer of asphalt and then another mat. The asphalt comes into contact with various roofing materials by initial contact and leaching. Such roofing materials include metallic structures such as eaves, gutters, flashings and nails. Therefore, it can be seen that a process to reduce $SO_x$ emissions should also produce an asphalt that does not have a detrimental effect on roofing materials, so that the materials do not rust, corrode or lose their strength. The asphalt should also be able to maintain a lasting bond with the other materials with which it comes in contact, including both metallic and non metallic materials.

DISCLOSURE OF THE INVENTION

There has now been developed a method for reducing $SO_x$ emissions from an asphalt blowing process comprising adding an emission reducing additive to the asphalt prior to blowing, or early in the blowing process. The emission reducing additive is added in an amount sufficient to reduce the $SO_x$ emissions from the blowing process by at least 25 percent by weight when compared with the same process without the emission reducing additive. The emission reducing additive comprises at least two compounds selected from the group consisting of metal hydroxides, metal oxides, metal carbonates and metal bicarbonates, where the metal is selected from the group consisting of sodium, potassium, calcium, magnesium, zinc, copper and aluminum. Preferably the compounds include at least one metal hydroxide selected from sodium, potassium, calcium or magnesium hydroxides, and at least one metal oxide selected from zinc, copper or aluminum oxides. More preferably, the additive comprises from about 0.05% to about 0.75% sodium hydroxide or potassium hydroxide, from about 0.02% to about 0.7% zinc oxide, and from about 0.01% to about 0.5% copper oxide, by weight of the combined mixture of asphalt and additive.

Surprisingly, it has been discovered that the addition of at least two of these compounds has a synergistic effect in the reduction of $SO_x$ emissions compared to the addition of a single compound. As a result, the emission reducing additive can contain lower levels of alkali hydroxide than would otherwise be required for the same emission reduction. Asphalts containing these lower levels of alkali hydroxide do not have a detrimental effect on roofing materials such as metallic structures. It has been found that higher levels of alkali hydroxide in the asphalt can have such a detrimental effect.

The emission reducing additive can also contain lower levels of zinc oxide or copper oxide than would be required if one of these compounds was added alone. Because these compounds are relatively expensive, the cost of the asphalt product is significantly reduced compared to an asphalt containing higher levels of a single one of these compounds.

The emission reducing additive enhances the softening point/viscosity/penetration relationships of the asphalt by increasing the penetration to a level above that which would be achieved without the additive. Also, other properties of the asphalt are improved such as pliability, ductility and weathering.

The process does not require high cost capital equipment, and does not produce any undesirable byproducts. The process does not greatly increase the mount of $NO_x$ emissions. The emission reducing additive is present in an amount which does not substantially change the rate of the asphalt blowing process when compared with the same process without the additive.

BEST MODE FOR CARRYING OUT THE INVENTION

The term "asphalt" as used in this specification includes any asphalt bottoms from petroleum refineries, as well as naturally occurring asphalts, tars and pitches. It is to be understood that the source of asphalt may have a significant effect on the final nature of the processed material. Unless otherwise specified, all percentages in this specification and claims are in terms of weight percent.

The asphalt blowing process involves passing air or other gases, such as steam, oxygen or carbon dioxide, through the asphalt in a converter at temperatures within the range of from about 150° C. to about 290° C. for a time from about 1 hour to about 18 hours. The air flow in the converter is usually from about 14–360 liters (STP) per hour/liter of processed asphalt. If desired, a conventional catalyst can be used in the process.

In accordance with this invention, an emission reducing additive is added to the asphalt to reduce $SO_x$ emissions from the blowing process. The emission reducing additive can be added by blending it into the asphalt prior to the blowing process, or by adding it into the converter early in the process, preferably within about the first two hours. The emission reducing additive is effective at every time of the process. However, peak $SO_x$ emissions are found generally during the first hour and a half in an air-blowing process without any additive. Therefore, if the emission reducing additive is added late in the process, it will reduce emissions only from the time it is blended into the asphalt.

The emission reducing additive comprises at least two compounds selected from the group consisting of metal hydroxides, metal oxides, metal carbonates and metal bicarbonates, where the metal is selected from the group consisting of sodium, potassium, calcium, magnesium, zinc, copper and aluminum. Preferably the additive includes at least one compound where the metal is selected from sodium, potassium, calcium or magnesium, and at least one compound where the metal is selected from zinc, copper or aluminum. More preferably, the additive includes at least one metal hydroxide selected from sodium, potassium, calcium or magnesium hydroxides, and at least one metal oxide selected from zinc, copper or aluminum oxides. In another preferred embodiment, the additive includes two compounds selected from the group consisting of zinc oxide, copper oxide and aluminum oxide. The copper oxide includes both cuprous oxide, $Cu_2O$, and cupric oxide, $CuO$.

Most preferably, the additive includes one compound selected from sodium hydroxide or potassium hydroxide, and one or two compounds selected from zinc oxide, copper oxide or aluminum oxide. The alkali hydroxide is important for providing the asphalt product with certain improved properties which are described below. Also, the alkali hydroxide is highly available, and it is less expensive than the metal oxide.

In a particularly preferred embodiment, the emission reducing additive comprises from about 0.05% to about 0.75% alkali hydroxide, from about 0.02% to about 0.7% zinc oxide, and from about 0.01% to about 0.5% copper oxide, by weight of the combined mixture of asphalt and additive. More preferably, the emission reducing additive comprises from about 0.1% to about 0.4% alkali hydroxide, from about 0.05% to about 0.4% zinc oxide, and from about 0.02% to about 0.15% copper oxide. Most preferably, the emission reducing additive comprises from about 0.1% to about 0.3% alkali hydroxide, from about 0.1% to about 0.3% zinc oxide, and from about 0.025% to about 0.1% copper oxide.

The preferred form of the sodium hydroxide or potassium hydroxide is in a concentrated water solution, preferably having at least 45 percent alkali hydroxide by weight in the solution. The alkali hydroxide can also be added as solid pellets. The mixing of the alkali hydroxide solution with the asphalt is preferably carried out in the converter itself, and at a temperature within the range of from about 90° C. to about 260° C. An alternative mixing process is to mix the asphalt with the alkali hydroxide in a tank separate from the converter.

The zinc, copper or aluminum oxide is added to the asphalt in particulate form, and preferably in the form of a powder. The mixing of the metal oxide with the asphalt is preferably carried out at a temperature within the range of from about 90° C. to about 260° C. Preferably, the metal oxide is mixed with the asphalt in a tank separate from the converter, although it can also be added to the asphalt in the converter. The metal oxide and the alkali hydroxide can also be added to a recirculating asphalt reflux. An alternative is to mix the metal oxide together with the alkali hydroxide and add the mix to the converter.

The emission reducing additive is added to the asphalt in an amount sufficient to reduce the $SO_x$ emissions from the blowing process by at least about 25% by weight over the same process without the additive, preferably at least about 40%, more preferably at least about 50%, and most preferably at least about 60%. The $SO_x$ emissions are measured by drawing a stream of effluent from the incinerator through a heated sample line at 127° C., then through a gas conditioner to remove moisture, and then through a Bovar Model 721 Photometric Analyzer at a flow rate of 1 liter/minute. The $SO_x$ emissions are measured in parts per million. The percent reduction in $SO_x$ emissions is calculated by comparing the $SO_x$ emissions with those from an asphalt not containing an emission reducing additive.

As described above, $NO_x$ emissions are another unpleasant gaseous byproduct from asphalt processing. Advantageously, the addition of the additive to reduce $SO_x$ emissions does not greatly increase the amount of $NO_x$ emissions. Preferably, the $NO_x$ emissions from the process are increased by not greater than about 30% by weight over the same process without the additive, more preferably not greater than about 20%, and most preferably not greater than about 10%. The $NO_x$ emissions are measured by the same process as the $SO_x$ emissions.

As discussed above, it has been discovered that the addition of two of the selected compounds has a synergistic effect in the reduction of $SO_x$ emissions compared to the addition of a single compound. Moreover, it has been discovered that the addition of a third compound has a further synergistic effect in the reduction of $SO_x$ emissions. Consequently, the emission reducing additive can contain lower levels of alkali hydroxide than would otherwise be required for the same emission reduction. These lower levels of alkali hydroxide avoid a detrimental effect on roofing materials which can be caused by asphalts containing higher levels of alkali hydroxide.

While the amount of alkali hydroxide is reduced, the emission reducing additive still contains a sufficient amount of alkali hydroxide to provide many benefits to the asphalt product. The emission reducing additive enhances the softening point/viscosity/penetration relationships of the asphalt by increasing the penetration to a level above that which would be achieved without the additive. As a result, the starting asphalt can be selected from a wide range of worldwide sources. The asphalt product has a penetration from about 12 mm/10 to about 35 mm/10 at 25° C. and a softening point from about 80° C. to about 120° C. The emission reducing additive also improves the pliability and ductility of the asphalt product.

A possible benefit of including the zinc and/or the copper in the asphalt itself is to reduce the growth of fungi and/or algae on roofing shingles made with the asphalt.

EXAMPLE I

An asphalt blend was made by mixing Amoco asphalt and Clark asphalt (both asphalts including Wyoming and Canadian crude sources). The asphalt had an initial softening point of about 38° C. and a penetration of about 300 mm/10 at 25° C. The asphalt was blown as both a straight run asphalt and with the addition of a first emission reducing additive in accordance with this invention. The additive comprised 0.2% sodium hydroxide, 0.165% zinc oxide, and 0.05% copper oxide, by weight of the combined mixture of asphalt and additive. To add the sodium hydroxide, 454 kilograms of the asphalt was placed in a converter at 205° C., and air was blown at 2300 liters (STP) per minute. Then, 10.9 kilograms of a 50 percent by weight solution of sodium hydroxide was added. Separately, to add the zinc oxide and copper oxide, 4.5 kilograms of zinc oxide powder and 1.36 kilograms of copper oxide powder were added to 2270 kilograms of asphalt in a mix tank. The asphalt in the mix tank was then pumped to the converter and mixed with the other asphalt to make a 2724 kilogram batch. This mixture was blown for about 15 minutes at a temperature of about 205° C., and an airflow of about 2300 liters (STP) per minute. The blowing process was continued at about 260° C., with an airflow of about 4600 liters (STP) per minute. The asphalt was blown to a target softening point of 105° C.

The $SO_x$ emissions from the incinerator were measured. The results are shown in Table I. It can be seen that the first emission reducing additive reduced the $SO_x$ emissions by about 70% over the same process without the additive.

An asphalt was blown in a manner similar to the process described above, as both a straight run asphalt and with the addition of a second emission reducing additive in accordance with this invention. The additive comprised 0.1% sodium hydroxide, 0.1% zinc oxide, and 0.05% copper oxide, by weight of the combined mixture of asphalt and additive. The $SO_x$ emissions from the incinerator were measured. The results are shown in Table I. It can be seen that the second emission reducing additive reduced the $SO_x$ emissions by about 67% over the same process without the additive.

TABLE I

| Asphalt % | Emission Reducing Additive | % Reduction |
| --- | --- | --- |
| 100% | none | — |
| 99.585% | 0.2% NaOH, 0.165% ZnO, and 0.05% CuO | 70% |
| 99.75% | 0.1% NaOH, 0.1% ZnO, and 0.05% CuO | 67% |

EXAMPLE II

Batches of asphalt were blown in a process similar to the process described in Example I. One batch was blown as a straight run asphalt. The other batches were blown with the addition of different emission reducing additives in accordance with this invention. The $SO_x$ emissions from the incinerator were measured. The results are shown in Table II. It can be seen that the emission reducing additives significantly reduced the $SO_x$ emissions.

TABLE II

| Asphalt % | Emission Reducing Additive | % Reduction |
| --- | --- | --- |
| 100% | none | — |
| 99.62% | 0.33% ZnO and 0.05% CuO | 45% |
| 99.5% | 0.25% ZnO and 0.25% NaOH | 46% |
| 99.52% | 0.33% ZnO, 0.05% CuO, and 0.10% NaOH | 80% |
| 99.685% | 0.165% ZnO, 0.05% CuO, and 0.10% NaOH | 75% |

EXAMPLE III

Batches of asphalt were blown in a process similar to the process described in Example I. A first batch was blown as a straight run asphalt. A second batch was blown with the addition of 0.2% NaOH. A third batch was blown with the addition of 0.05% CuO and 0.165% ZnO. A fourth batch was blown with the addition of all three compounds, 0.2% NaOH, 0.05% CuO and 0.165% ZnO. The $SO_x$ emissions from the incinerator were measured. The results are shown in Table III. It can be seen that the emission reducing additive containing all three compounds had a synergistic effect in reducing the $SO_x$ emissions.

TABLE III

| Asphalt % | Emission Reducing Additive | % Reduction |
|---|---|---|
| 100% | none | — |
| 99.8% | 0.2% NaOH | 15% |
| 99.785% | 0.05% CuO and 0.165% ZnO | 45% |
| 99.585% | 0.2% NaOH, 0.05% CuO and 0.165% ZnO | 70% |

EXAMPLE IV

Batches of asphalt were blown in a process similar to the process described in Example I. A first batch was blown as a straight run asphalt. A second batch was blown with the addition of 0.25% NaOH. A third batch was blown with the addition of 0.5% ZnO. A fourth batch was blown with the addition of 0.25% NaOH and 0.25% ZnO. The $SO_x$ emissions from the incinerator were measured. The results are shown in Table IV. The percent reduction provided by 0.25% ZnO would be expected to be about 10% (i.e., about one-half the percent reduction provided by the addition of 0.5% ZnO). It can be seen that the emission reducing additive containing both 0.25% NaOH and 0.25% ZnO had a synergistic effect in reducing the $SO_x$ emissions.

TABLE IV

| Asphalt % | Emission Reducing Additive | % Reduction |
|---|---|---|
| 100% | none | — |
| 99.75% | 0.25% NaOH | 30% |
| 99.75% | 0.5% ZnO | 20% |
| 99.5% | 0.25% NaOH and 0.25% ZnO | 46% |

EXAMPLE V

Batches of asphalt were blown in a process similar to the process described in Example I. A first batch was blown as a straight run asphalt. A second batch was blown with the addition of 1% NaOH. A third batch was blown with the addition of 0.5% NaOH. A fourth batch was blown with the addition of 0.25% NaOH. A filth batch was blown with the addition of an emission reducing additive in accordance with this invention: 0.2% NaOH, 0.165% ZnO and 0.05% CuO. The $NO_x$ emissions from the incinerator were measured. The results are shown in Table V. It can be seen that the $NO_x$ emissions were increased from asphalt containing the higher levels of NaOH. Advantageously, the emission reducing additive of this invention did not significantly increase the $NO_x$ emissions from the asphalt.

TABLE V

| Asphalt % | Emission Reducing Additive | % Increase |
|---|---|---|
| 100% | none | — |
| 99% | 1% NaOH | 50% |
| 99.5% | 0.5% NaOH | 40% |
| 99.75% | 0.25% NaOH | 20% |
| 99.585% | 0.2% NaOH, 0.165% ZnO and 0.05% CuO | 0–10% |

EXAMPLE VI

Batches of asphalt were blown in a process similar to the process described in Example I. A first batch was blown as a straight run asphalt. A second batch was blown with the addition of 1% $Na_2CO_3$. A third batch was blown with the addition of 0.1% $Na_2CO_3$ and 0.1% $Mg(OH)_2$. The $SO_x$ emissions from the incinerator were measured. The results are shown in Table VI. It can be seen that the combination of $Na_2CO_3$ and $Mg(OH)2$ had a synergistic effect in reducing $SO_x$ emissions compared to the use of $Na_2CO_3$ alone.

TABLE VI

| Asphalt % | Emission Reducing Additive | % Reduction |
|---|---|---|
| 100% | none | — |
| 99% | 1% $Na_2CO_3$ | 26% |
| 99.8% | 0.1% $Na_2CO_3$ and 0.1% $Mg(OH)_2$ | 26% |

EXAMPLE VII

Two different asphalt samples were tested for any detrimental effect on galvanized nails. The first sample was the asphalt of Example I containing 0.2% NaOH, 0.165% ZnO and 0.05% CuO. The second sample was an asphalt containing 1.0% NaOH. The asphalt samples were each placed into a beaker, and two galvanized nails were immersed in each asphalt sample. The asphalt samples were subjected to 14 cycles in a weatherometer according to ASTM Method D4798, to simulate weather conditions encountered by roofing materials over a prolonged period. The galvanized nails were then removed from the asphalt samples and visually inspected. The galvanized nails treated in the asphalt containing 1.0% NaOH had significant areas of rest on their surface. In contrast, the galvanized nails treated in the asphalt of Example I showed no signs of rest and were not substantially affected by the asphalt. It is also expected that the asphalt would have no substantial effect on other metallic roofing materials.

INDUSTRIAL APPLICABILITY

The invention can be useful in processing asphalt for such uses as roofing asphalt, specialty asphalt, and Strategic Research Highway Program (SHRP) applications.

We claim:

1. A method for reducing emissions from an asphalt blowing process comprising adding to asphalt an emission-reducing additive in an amount sufficient to reduce the $SO_x$ emissions from the blowing process by at least about 25 percent by weight over the same process without the additive, wherein the additive comprises: (a) at least one compound selected from the group consisting of metal hydroxides, metal oxides, metal carbonates and metal bicarbonates, where the metal is selected from the group consisting of sodium, potassium, calcium and magnesium; and (b) at least one compound selected from the group consisting of metal hydroxides, metal oxides, metal carbonates and metal bicarbonates, where the metal is selected from the group consisting of zinc, copper and aluminum.

2. A method as defined in claim 1, wherein said at least one compound (a) comprises at least one metal hydroxide selected from the group consisting of sodium hydroxide, potassium hydroxide, calcium hydroxide and magnesium hydroxide, and said at least one compound (b) comprises at least one metal oxide selected from the group consisting of zinc oxide, copper oxide and aluminum oxide.

3. A method as defined in claim 1, wherein the additive further comprises (c) a compound different from said compounds (a) and (b), and selected from the group consisting of metal hydroxides, metal oxides, metal carbonates and metal bicarbonates, where the metal is selected from the group consisting of sodium, potassium, calcium, magnesium, zinc, copper and aluminum.

4. A method as defined in claim 3, wherein: said compound (a) is sodium hydroxide, potassium hydroxide, calcium hydroxide or magnesium hydroxide; said compound (b) is zinc oxide, copper oxide or aluminum oxide; and said compound (c) is zinc oxide, copper oxide or aluminum oxide.

5. A method as defined in claim 4, wherein said compound (a) is an alkali hydroxide selected from the group consisting of sodium hydroxide and potassium hydroxide.

6. A method as defined in claim 5, wherein said compound (b) is zinc oxide and said compound (c) is copper oxide.

7. A method as defined in claim 6, wherein the alkali hydroxide (a) is present in an amount of from about 0.05% to about 0.75% by weight of the combined asphalt and additive, the zinc oxide (b) is present in an amount of from about 0.02% to about 0.7% by weight of the combined asphalt and additive, and the copper oxide (c) is present in an amount of from about 0.01% to about 0.5% by weight of the combined asphalt and additive.

8. A method as defined in claim 6, wherein the alkali hydroxide (a) is present in an amount of from about 0.1% to about 0.25% by weight of the combined asphalt and additive, the zinc oxide (b) is present in an amount of from about 0.1% to about 0.2% by weight of the combined asphalt and additive, and the copper oxide (c) is present in an amount of from about 0.025% to about 0.05% by weight of the combined asphalt and additive.

9. A method as defined in claim 8, in which the alkali hydroxide (a) is sodium hydroxide.

10. A method as defined in claim 8, in which the alkali hydroxide is added in the form of an aqueous solution containing at least 45% by weight of the alkali hydroxide, and the zinc oxide and copper oxide are added in the form of a particulate solid.

11. A method as defined in claim 10, wherein: said adding comprises mixing a portion of the asphalt with the alkali hydroxide in a converter at a temperature of from about 90° C. to about 260° C. to form a first mixture, separately mixing the zinc oxide and the copper oxide with a portion of the asphalt in a tank at a temperature of from about 90° C. to about 260° C. to form a second mixture, and combining the first and second mixtures to form an asphalt-additive mixture; and air-blowing the asphalt-additive mixture.

12. A method as defined in claim 1, wherein the additive is added to the asphalt in an amount sufficient to reduce the $SO_x$ emissions from the blowing process by at least about 40 percent by weight over the same process without the additive.

13. A method as defined in claim 1, wherein the additive is added to the asphalt in an mount sufficient to reduce the $SO_x$ emissions from the blowing process by at least about 50 percent by weight over the same process without the additive.

14. A method as defined in claim 1, wherein the asphalt containing the additive has no substantial effect on metallic roofing materials when subjected to fourteen cycles in a weatherometer according to ASTM Method D4798.

15. A method as defined in claim 1, wherein the additive is added to the asphalt in an amount increasing $NO_x$ emissions from the blowing process by not greater than about 30 percent by weight over the same process without the additive.

16. A method as defined in claim 1, wherein the additive is added to the asphalt prior to the blowing process.

17. A method for reducing emissions from an asphalt blowing process comprising adding to the asphalt an emission reducing additive in an amount sufficient to reduce the $SO_x$ emissions from the blowing process by at least about 25% by weight over the same process without the additive, where the additive comprises at least three compounds selected from the group consisting of metal hydroxides, metal oxides, metal carbonates and metal bicarbonates, where the metal is selected from the group consisting of sodium, potassium, calcium, magnesium, zinc, copper and aluminum, and the additive comprises at least one metal hydroxide selected from the group consisting of sodium hydroxide, potassium hydroxide, calcium hydroxide and magnesium hydroxide, and at least one metal oxide selected from the group consisting of zinc oxide, copper oxide and aluminum oxide.

18. The method of claim 17 in which the additive is added to the asphalt in an amount sufficient to reduce the $SO_x$ emissions from the blowing process by at least about 40% by weight over the same process without the additive.

19. The method of claim 17 in which the additive is added to the asphalt in an amount sufficient to reduce the $SO_x$ emissions from the blowing process by at least about 50% by weight over the same process without the additive.

20. A method for reducing emissions from an asphalt blowing process comprising adding to the asphalt an emission reducing additive in an amount sufficient to reduce the $SO_x$ emissions from the blowing process by at least about 40% by weight over the same process without the additive, where the additive supplies about 0.05% to about 0.75% alkali hydroxide selected from the group consisting of sodium hydroxide, potassium hydroxide, and mixtures thereof, from about 0.02% to about 0.7% zinc oxide, and from about 0.01% to about 0.5% copper oxide, by weight of the combined mixture of asphalt and additive.

* * * * *

UNITED STATES PATENT AND TRADEMARK OFFICE
CERTIFICATE OF CORRECTION

PATENT : 5,611,910
DATED : March 18, 1997
INVENTOR(S) : Jorge A. Marzari, et al

It is certified that error appears in the above-identified patent and that said Letters Patent is hereby corrected as shown below:

In Claim 13, line (column 10, line 2), "mount" is changed to --amount--.

Signed and Sealed this

Eleventh Day of November, 1997

Attest:

BRUCE LEHMAN

Attesting Officer

Commissioner of Patents and Trademarks